Patented Mar. 2, 1943

2,312,896

UNITED STATES PATENT OFFICE 2,312,896

CONDENSATION PRODUCT AND PROCESS FOR PREPARING SAME

Charles Graenacher, Riehen, Richard Sallmann, Bottmingen, and Otto Albrecht, Munchenstein, Switzerland, assignors to Society of Chemical Industry in Basle, Basel, Switzerland No Drawing. Application January 22, 1941, Serial No. 375,536. In Switzerland January 22, 1940

22 Claims. (Cl. 260—399)

It has been found that new condensation products are obtained when N-hydroxymethylamides of carboxylic acids are caused to react, in the presence of condensing agents, with aromatic compounds which contain at least one hydrogen atom connected to the aromatic nucleus and at least one high molecular aliphatic of cyclo-aliphatic radical, and if, if desired, groups conferring water-soluble properties are introduced by known methods into the condensation products obtained.

The N-hydroxymethylamides of carboxylic acids which are to serve as parent materials may be derived, for example, from aliphatic or aromatic carboxylic acids. The following, for example, come into consideration: the carboxylic acid methylolamides of acetic, chloracetic, bromacetic, sulfoacetic, α-chloropropionic, β-chloropropionic, α-bromobutyric, α-bromolauric, and α-bromostearic acids; furthermore, the methylolamides of benzoic, p-chloromethylbenzoic and salicylic acids. These methylolamides are either known or may be prepared by analogous processes, for example, from the amides by means of paraformaldehyde in the presence of basic substances, such as tertiary amines or alkali carbonates.

The aromatic compounds which may be used as parent materials, for instance, those of the benzene and naphthalene series, which contain at least one hydrogen atom united to the aromatic nucleus and at least one high molecular aliphatic or cycloaliphatic radical, may be derived, for instance, from hydrocarbons, hydroxy compounds, amino compounds, carboxylic acids, or sulfonic acids. Particularly suitable are those substitution products of aromatic compounds which contain as a radical of high molecular weight a high molecular alkyl radical or a high molecular acyl radical of the aliphatic or cyclo-aliphatic series. These alkyl or acyl radicals may be interrupted by hetero atoms, such as oxygen, nitrogen or sulfur, or by groups containing such hetero atoms. Compounds which come into consideration are, for example, hydrocarbons which are substituted by high molecular alkyl radicals, such as hexadecylbenzene; furthermore, alkylated phenols, such as p-hexadecylphenol, p-octadecylphenol; as well as hydroxyphenyl-ketones, such as p-hydroxyphenyl-heptadecylketone. A particularly suitable, easily available and reactive parent material consists of the aromatic amines which are substituted in the amino group by high molecular acyl radicals of the aliphatic or cycloaliphatic series, for example, by radicals of high molecular fatty acids, resin acids or naphthene acids. This type of acylated aromatic amine may be derived, for example, from aniline, o- or p-toluidine, phenylenediamines, α- or β-naphthylamines. Among the acyl radicals which may be substituents in the amino groups of the amines mentioned may be mentioned, for example, the radicals of lauric, palmitic, stearic, oleic and behenic acids. The aliphatic and cycloaliphatic radicals of high molecular weight mentioned above may be designated as radicals which contain at least eight carbon atoms and are free from conjugated double bonds. This definition excludes aromatic radicals which, as is known, contain conjugated double bonds.

The aromatic compounds mentioned, which serve as parent materials, are either known or may readily be prepared by analogous processes.

The reaction between the N-hydroxymethylamides of carboxylic acids and the aromatic compounds may be carried out by mixing the reaction components in the presence of a condensing agent. Suitable condensing agents are, for example, concentrated sulfuric acid, alcoholic hydrochloric acid, glacial acetic acid, as well as zinc chloride. These substances are known as acid reacting substances. When concentrated sulfuric acid is used as condensing agent it is recommended to work at low temperatures, for example, at 5–10° C., at least, at the beginning of the reaction. In other cases, for instance, when zinc chloride is used as condensing agent, it is frequently preferable to increase the speed of the reaction by heating. In case the condensing agent used, such as concentrated sulfuric acid, does not act simultaneously as a solvent, it is frequently preferable to make use of solvents, such as glacial acetic acid.

If the condensation products derived from the methylolamides and the substituted aromatic compounds do not already contain groups conferring water-soluble properties, these may be introduced by known methods, for example, by effecting a water-solubilizing step. The following may be named as examples of groups conferring water-soluble properties: sulfonic acid groups, sulfuric acid ester groups, thiosulfuric acid groups, as well as onium groups such as quaternary ammonium or tertiary sulfonium groups, furthermore, amino or imino groups or radicals containing such groups, for example, radicals derived from thioureas, cyanamide, dicyandiamide. The most important water-solubilizing groups are members of the group consisting of acid and neutralized sulfonic acid groups, neutralized thiosulfuric acid groups, neutralized sulfuric acid ester groups, quaternary ammonium groups, ternary sulfonium groups, amino and imino groups in salt form, thiourea radicals in salt form, polyhydroxyalkyl radicals, and polyglylcol radicals.

The introduction of sulfonic acid or sulfuric acid ester groups may be brought about by treatment of the condensation products with sulfonating agents. It is particularly easy to introduce water-solubilizing groups into those condensation products which contain a reactive substituent, for example, a reactive halogen atom. Such an atom may be converted into a thiosulfuric acid group, for example, by treatment with alkali thiosulfates in the presence of solvents, such as methanol, acetone. Furthermore, reactive halogen atoms may be converted into amino groups by treatment with ammonia, primary or secondary amines. Quaternary ammonium groups may be introduced by addition of tertiary amines, such as trimethylamine, pyridine, methylpiperidine, hexamethylenetetramine, to the condensation product containing the reactive halogen atom. This reactive atom, however, may be exchanged for iso-thiourea radicals by treatment with thioureas which may react in the iso-form, preferably in the presence of solvents, such as acetone or alcohol. Among the thioureas which may react in the iso-form may be mentioned: Thiourea itself, allyl thiourea, N-methyl-, N-ethyl- and N-hydroxyethyl-urea. Radicals containing imino or amino groups which are also capable of causing water-solubility in the salt form, may furthermore be introduced by treatment of these condensation products which contain reactive halogen atoms with cyanamide, dicyandiamide, preferably in the presence of solvents, such as acetone. Polyhydroxy alkyl radicals may be introduced by reaction of those condensation products which contain reactive halogen atoms with thioglycerine or polyglycerine. Hydroxy groups present in the condensation products may be etherified with polyglycols with the aid of ethylene oxide or with glycidol.

In the course of the condensation carried out according to the present invention between the methylolamides and the substituted aromatic compounds it is probable that water is eliminated by the union of a nuclear hydrogen atom with the hydroxy group of the methylolamide. Should one molecule of a substitution product of the benzene series be caused to react with one molecule of a carboxylic acid methylolamide, it is probable that a substitution product of an acylated benzyl-amine is formed. It is, however, also possible, by suitable choice of parent materials, to prepare corresponding derivatives of xylylene diamine, provided 2 molecules of the carboxylic acid methylolamide be allowed to react upon one molecule of a substitution product of the benzene series.

The products of the present invention may be designated as aromatic compounds in which at least one hydrogen atom of an aromatic nucleus is replaced by a radical containing at least 8 carbon atoms and being free from conjugated double bonds and in which at least another hydrogen atom of an aromatic nucleus is replaced by an aminomethyl group acylated with a carboxylic acid, which products are identical with those which are obtainable by the process which comprises reacting a N-hydroxymethyl- amide of a carboxylic acid with an aromatic compound containing at least one hydrogen atom bound to an aromatic nucleus and at least one radical which contains at least 8 carbon atoms and is free from conjugated double bonds in the presence of an acid reacting substance and are liquid to solid substances which are decomposed by boiling with hydrochloric acid to form the corresponding carboxylic acids and the hydrochlorides of aminomethyl derivatives of substituted aromatic compounds. They may be represented by the formula

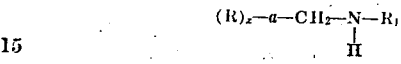

wherein R stands for a radical containing at least 8 carbon atoms and being free from conjugated double bonds, i. e. for an aliphatic or cycloaliphatic radical containing at least 8 carbon atoms, $x$ is a low whole number, $a$ represents an aromatic radical, for instance, one of the benzene or naphthalene series, $R_1$ is an acyl radical of a carboxylic acid. The acyl radical $R_1$ may contain a water-solubilizing group. Very valuable are the products of the formulae

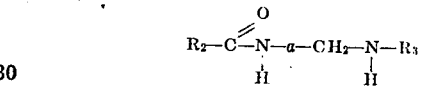

and

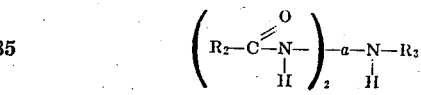

wherein $R_2$ is an alkyl radical containing more than 7 carbon atoms, $a$ is a radical of the benzene or naphthalene series and $R_3$ is an acyl radical of an aliphatic carboxylic acid containing a water-solubilizing group. As the constitution of the products of the present invention has not been ascertained in all cases with certainty, the products are best described by the process of their manufacture.

The condensation products obtainable by the present invention, insofar as they are water-soluble and are prepared from suitable parent materials, may find application as textile auxiliaries, for example, as wetting, cleaning, washing, emulsifying, dispersing, foaming, softening, and levelling agents. For these purposes, those condensation products are particularly suitable which contain an aliphatic or cycloaliphatic radical of high molecular weight. Such products, for example, those which are derived from condensation products from fatty acids of high molecular weight and acylated amines, especially those which are cation active, are particularly suitable for the purposes of softening and rendering dyeings obtained with acid dyestuffs fast to water. Auxiliary products for the dyehouse, especially for the dyeing with metallic complex compounds, are represented by those soluble products of the present invention which are free from ionogenic dissociating groups, for example, derivatives of thioglycerine.

The products obtained according to the present invention may be used alone or in combination with acid substances, particularly with salts of weak acids, for example, sodium acetate, also with soaps, soap-like materials, protective colloids, finishing, weighting, softening or delustring agents and the like.

Example 1

28 parts of finely powdered stearic acid anilide are slowly introduced into 140 parts of concentrated sulfuric acid whilst stirring. When all is dissolved, 14 parts of N-methylol-chloracetamide are introduced in small portions whilst cooling with ice. The temperature should not rise above 10° C. After all has been added, the reaction mixture is stirred overnight at room temperature, when the condensation is complete. After the mixture has been poured onto ice, the solid matter formed is filtered off, washed with water and recrystallized from alcohol. The new product of the formula

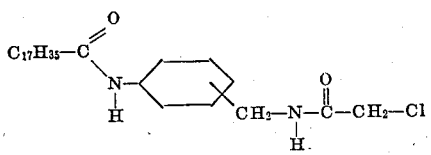

is a colorless, crystalline powder which is completely insoluble in water but which dissolves in the common organic solvents.

Instead of stearic acid anilide, stearic acid β-naphthylamide or stearic acid m-chloranilide may be used in a similar manner.

Example 2

13 parts of the condensation product obtained as described in Example 1 from stearic acid anilide and methylolchoracetamide are heated with 40 parts of an alcholic trimethylamine solution containing 25 per cent of trimethylamine for four hours in a bomb tube. After distilling off the alcohol in vacuo, the quaternary salt of the formula

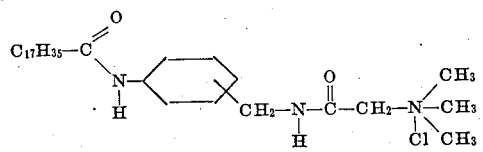

is obtained as a white, water-soluble powder, which gives a clear solution with water. The aqueous solution foams strongly and exhibits exceptional cation active properties.

In a similar manner, the condensation product from stearic acid β-naphthylamide or stearic acid m-chloranilide or stearoylaminoanthracene or a chloronaphthenic acid anilide and methylolchloracetamide or α-bromopropionic acid methylolamide may be treated with the trimethylamine.

Example 3

4.6 parts of the condensation product obtained from stearic acid anilide and methylolchloracetamide, prepared according to Example 1, are heated with 1.4 parts of N-dimethylcyclohexylamine for 4 hours to 120–130° C., when a test sample, after dissolving in a little glacial acetic acid and dilution with water, yields a clear, foaming solution which posseses exceptional cation active properties and which is suitable for the softening of textiles. The product thus obtained corresponds with the formula

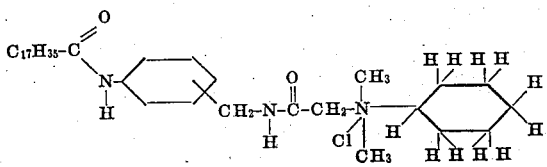

Example 4

2.3 parts of the condensation product from stearic acid anilide and methylolchloracetamide are dissolved in 20 parts by volume of absolute alcohol. After addition of 1 part of allyl-thiourea, the solution is heated for 3 hours under reflux at the boil, until a test sample of the reaction mixture is soluble to a clear solution in water. Ether is now added to the alcoholic solution, when the product is precipitated as a white powder and may be filtered off at the pump. The new allyl-thiourea derivative, of the formula

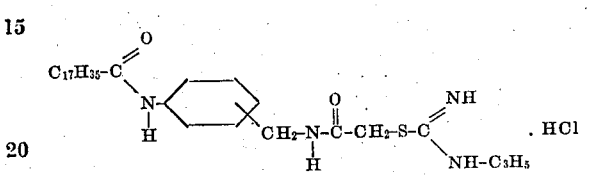

or

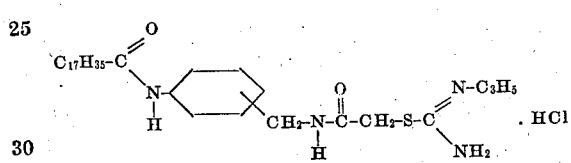

is clearly soluble in hot water and forms strongly foaming solutions which possess strongly cation active properties.

In a similar manner, the derivative of the unsubstituted thiourea may be prepared, the following method of working being adopted:

2.3 parts of the condensation product from stearic acid anilide and N-methylolchloracetamide are dissolved in 20 parts by volume of absolute alcohol. 0.7 part of thiourea is introduced into the solution, which is then heated for 4 hours at the boil under reflux. The reaction mixture is filtered hot and the filtrate is strongly cooled, when the hydrochloric acid salt of the iso-thiourea compound crystallizes out as a colorless salt. The compound is soluble to a clear solution.

It is also possible to work in the following manner:

4.6 parts of the condensation product from stearic acid anilide and methylolchloracetamide, prepared as described in Example 1, are dissolved in 18 parts by volume of glacial acetic acid, together with 1.5 parts of thiourea. The reaction solution is heated for 30 minutes, on the steam bath, when a test sample is soluble to a clear solution in water. The reaction mass is heated with 50 parts by volume of alcohol until it is dissolved. After cooling, the thiourea compound crystallizes to form a white powder on drying, which has an excellent softening action on textiles.

Example 5

1 part of finely powdered caustic soda is dissolved in 40 parts of thioglycerine with gentle heating. To this solution 9.2 parts of the condensation product from stearic acid anilide and methylolchloracetamide are added and the mixture is heated with stirring for 6 hours to 110–120° C., when a test sample is soluble in water to form a clear solution. By addition of acetone, the product is precipitated and may then be recrystallized from alcohol. The new compound, of the formula

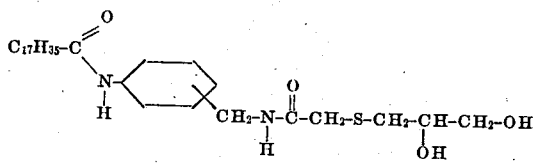

is soluble in water and is stable to acids and alkalis. The product exerts a pronounced levelling action when added to acid dyebaths for wool dyeing.

*Example 6*

42 parts of coconut oil fatty acid anilide are dissolved in 90 parts of concentrated sulfuric acid at 10° C. Whilst stirring well at 5–10° C., 18 parts of N-methylolchloracetamide are strewn into the solution. After stirring for 24 hours at room temperature the reaction mixture is poured on to ice, the precipitated product is filtered off, washed with water until the wash-water is neutral and dried in vacuo. The new chloracetylated compound thus obtained, of the formula

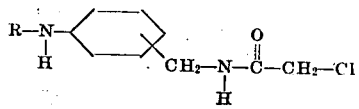

wherein R is the acyl radical of the coconut oil fatty acid, is a white powder which is completely insoluble in water but which, as described in Examples 2 and 3, may be converted into valuable cation active compounds by the action of tertiary bases or thioureas.

*Example 7*

14 parts of coconut oil fatty acid anilide are dissolved in 50 parts of concentrated sulfuric acid at 10° C. Whilst stirring well, 13 parts of N-methylolacetamide sulfonic acid sodium salt are strewn in at 5–8° C. After stirring for 4 hours at room temperature, a sample gives a clear solution with water. The reaction mixture is poured on to ice and the new sulfonic acid is extracted several times with butyl alcohol. The butyl alcohol solution is neutralized with ammonia, after which it is evaporated to dryness in vacuo at 50–60° C. The product of the formula

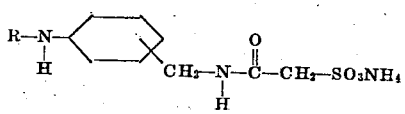

wherein R is the acyl radical of the coconut oil fatty acid, is a light colored powder, soluble in water to form a strongly foaming solution. Its aqueous solution possesses good wetting and washing powers.

*Example 8*

16 parts of stearic acid anilide are dissolved in 75 parts of concentrated sulfuric acid at 10–15° C. Whilst stirring well, 13 parts of N-methylolacetamide sodium sulfonate are slowly strewn in at 5–10° C. After stirring for 20 hours at room temperature, the reaction mixture is poured on to ice, saturated Glauber's salt solution is added and the precipitated product is filtered off. The residue is pressed off and dissolved in hot water, after which it is neutralized with sodium carbonate and evaporated to dryness in vacuo at 60–65° C. A colorless powder, of the formula

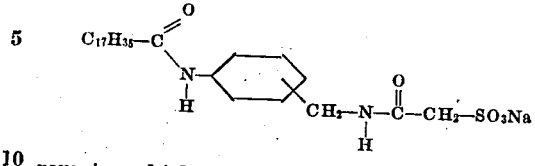

remains which is soluble in water to a clear solution. The aqueous solution foams strongly and possesses good washing powers.

*Example 9*

8.2 parts of N-acetyl-N'-stearoyl-m-phenylenediamine, obtained by treatment of m-aminoacetanilide with stearic acid chloride in pyridine, are dissolved in 80 parts by volume of glacial acetic acid and 3.2 parts of N-methylolchloracetamide and 8 parts of zinc chloride are added. The solution is heated to 40–45° C. for 20 hours, after which it is poured into water and the precipitate is filtered off. After washing with water, the residue is recrystallised from alcohol. The intermediate product which, after filtering, still contains alcohol, is dissolved by warming with 90 parts by volume of alcohol and, after addition of 40 parts by volume of an alcoholic trimethylamine solution of 25% strength, is heated in a closed vessel for 20 hours at 40–45° C. The excess of trimethylamine is distilled away, followed by the alcohol; the residue is a yellowish colored powder of the formula

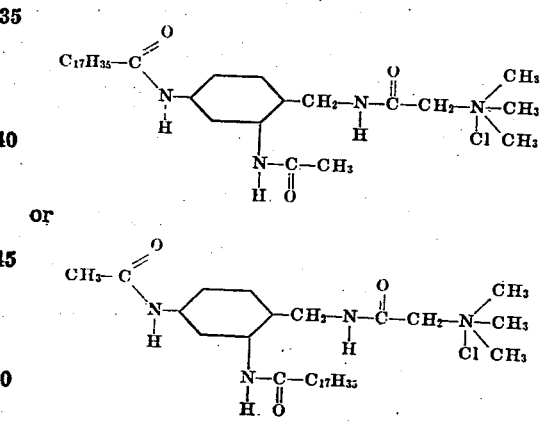

or which dissolves in water, forming a clear, strongly foaming solution. The solution may be used for the softening of textiles or as an addition to dyebaths.

*Example 10*

19.2 parts of distearoyl-m-phenylenediamine, prepared by heating stearic acid with m-phenylenediamine, are dissolved in 180 parts by volume of glacial acetic acid. After the addition of 15 parts of zinc chloride and 10.5 parts of methylolchloracetamide the clear solution is heated to 50–55° C. for 48 hours. It is then decanted from small quantities of separated solid matter and is diluted with 500 parts by volume of water. The precipitated condensation product is then filtered off. By solution in an organic solvent, such as chloroform, drying the solution with calcium chloride and removal of the solvent it may be obtained in a pure form.

14 parts of this condensation product are heated for 4 hours in a bomb tube at 100–110° C. with 40 parts of an alcoholic trimethylamine solution of 26% strength. After distilling off the trimethylamine and alcohol, the new product of the formula

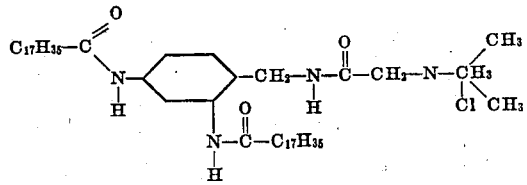

remains as a brownish powder, soluble in water. Its aqueous solutions have an excellent softening effect on textiles.

*Example 11*

3.5 parts of p-octadecylphenol are dissolved in 30 parts of glacial acetic acid. 4 parts of zinc chloride and 1.5 parts of N-methylolchloracetamide are added and the clear solution is allowed to stand at room temperature for 48 hours. The reaction product is then poured into water and the resin-like precipitate is obtained by decantation, washed with water several times and dissolved in ether. After drying the ethereal solution with calcium chloride the ether is distilled and the residue is heated for 1 hour at 100–105° C. in an autoclave with 40 parts of an alcoholic solution of trimethylamine of 25% strength. After distilling off the trimethylamine and alcohol, a brownish, soft mass is obtained of the formula

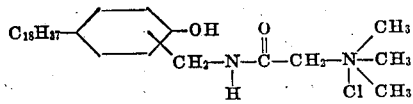

which is readily soluble in water. The aqueous solution has good foaming and marked capillary active properties.

*Example 12*

7 parts of stearic acid anilide are dissolved in 35 parts of concentrated sulfuric acid whilst cooling with ice. 4.5 parts of the quaternary salt obtained from methylolchloracetamide and trimethylamine is added in small quantities at a time to this solution whilst stirring at a temperature of 0–5° C. After allowing the reaction mixture to stand for 16 hours at room temperature the reaction is complete, and a sample of the reaction mixture gives a foaming solution in water. The reaction product is poured on to ice and neutralised with caustic soda. It is then evaporated to dryness and is purified by recrystallization from alcohol. It is a white powder which is readily soluble in water. The aqueous solution foams strongly and possesses excellent capillary active properties.

Instead of concentrated sulfuric acid, glacial acetic acid may be used as condensing agent at a temperature of 50–120° C. and it is preferable in this case that the glacial acetic acid should contain either hydrochloric acid or zinc chloride.

*Example 13*

0.05 part of the product obtained in Example 2 is dissolved in water and the treating bath thus obtained is bulked to 3000 parts, so that the ratio existing between material and treating bath will be that of 1:30. 100 parts of viscose rayon yarn are now entered into this bath and are treated therein for ½ hour at 30° C., after which they are hydro-extracted and dried.

The yarn then exhibits an excellently soft handle.

What we claim is:

1. Process for the manufacture of condensation products, which comprises reacting a N-hydroxymethylamide of a carboxylic acid with a member of the group consisting of compounds of the benezne and naphthalene series containing at least one hydrogen atom bound to an aromatic nucleus and at least one radical which contains at least 8 carbon atoms and is free from conjugated double bonds in the presence of an acid reacting substance.

2. Process for the manufacture of condensation products, which comprises reacting a N-hydroxymethylamide of a carboxylic acid with a member of the group consisting of compounds of the benzene and naphthalene series containing at least one hydrogen atom bound to an aromatic nucleus and at least one radical which contains at least 8 carbon atoms and is free from conjugated double bonds in the presence of an acid reacting substance and effecting a water-solubilizing step.

3. Process for the manufacture of condensation products, which comprises reacting a N-hydroxymethylamide of a carboxylic acid with a member of the group consisting of compounds of the benzene and naphthalene series containing at least one hydrogen atom bound to an aromatic nucleus and at least one aliphatic radical which contains at least 8 carbon atoms in the presence of an acid reacting substance and effecting a water-solubilizing step.

4. Process for the manufacture of condensation products, which comprises reacting a N-hydroxymethylamide of an aliphatic halogen carboxylic acid with a compound of the benzene series containing at least one hydrogen atom bound to a benzene nucleus and at least one amino group acylated with a fatty acid containing at least 12 carbon atoms in the presence of an acid reacting substance and effecting a water-solubilizing step.

5. Process for the manufacture of condensation products, comprising reacting a N-hydroxymethylamide of an aliphatic halogen carboxylic acid of low molecular weight with a compound of the benzene series containing at least one hydrogen atom bound to a benzene nucleus and one amino group acylated with a fatty acid containing at least 12 carbon atoms in the presence of an acid reacting substance and effecting a water-solubilizing step.

6. Process for the manufacture of condensation products, which comprises reacting the N-hydroxymethylamide of monochloroacetic acid with a compound of the benzene series containing at least one hydrogen atom bound to a benzene nucleus and one amino group acylated with a fatty acid containing at least 12 carbon atoms in the presence of an acid-reacting substance and effecting a water-solubilizing step.

7. Process for the manufacture of condensation products, which comprises reacting the N-hydroxymethylamide of monochloroacetic acid with a compound of the benzene series containing at least one hydrogen atom bound to a benzene nucleus and one amino group acylated with a fatty acid containing at least 12 carbon atoms in the presence of an acid reacting substance and treating the reaction product thus obtained with a tertiary amine.

8. Process for the manufacture of condensation products, which comprises reacting the N-hydroxymethylamide of monochloroacetic acid with stearic acid anilide in the presence of an acid reacting substance and treating the reaction product thus obtained with trimethylamine.

9. Process for the manufacture of condensation products, which comprises reacting the N-hydroxymethylamide of monochloroacetic acid with stearic acid anilide in the presence of an acid reacting substance and treating the reaction product thus obtained with thioglycerine.

10. Process for the manufacture of condensation products, which comprises reacting a N-hydroxymethylamide of an aliphatic halogen carboxylic acid of low molecular weight with a compound of the benzene series containing at least one hydrogen atom bound to a benzene nucleus and two amino groups acylated with a fatty acid containing at least 12 carbon atoms in the presence of an acid reacting substance and effecting a water-solubilizing step.

11. Process for the manufacture of condensation products, which comprises reacting the N-hydroxymethylamide of monochloroacetic acid with distearoyl meta phenylenediamine in the presence of an acid reacting substance and treating the reaction product thus obtained with trimethylamine.

12. Aromatic compounds selected from the group consisting of compounds of the benzene and naphthalene series in which at least one hydrogen atom of an aromatic nucleus is replaced by a radical containing at least 8 carbon atoms and being free from conjugated double bonds and in which at least another hydrogen atom of an aromatic nucleus is replaced by an aminomethyl group acylated with a carboxylic acid, which products are liquid to solid substances which are decomposed by boiling with hydrochloric acid to form the corresponding carboxylic acids and the hydrochlorides of aminomethyl derivatives of substituted aromatic compounds.

13. Aromatic compounds selected from the group consisting of compounds of the benzene and naphthalene series in which at least one hydrogen atom of an aromatic nucleus is replaced by a radical containing at least 8 carbon atoms and being free from conjugated double bonds and in which at least another hydrogen atom of an aromatic nucleus is replaced by an aminomethyl group acylated with a carboxylic acid containing a water-solubilizing group which products are liquid to solid water-soluble capillary active substances which are decomposed by boiling with hydrochloric acid to form the corresponding carboxylic acids and the hydrochlorides of aminomethyl derivatives of substituted aromatic compounds.

14. Aromatic compounds selected from the group consisting of compounds of the benzene and naphthalene series in which at least one hydrogen atom of an aromatic nucleus is replaced by an aliphatic radical containing at least 8 carbon atoms and in which at least another hydrogen atom of an aromatic nucleus is replaced by an aminomethyl group acylated with a carboxylic acid containing a water-solubilizing group, which products are liquid to solid water-soluble capillary active substances which are decomposed by boiling with hydrochloric acid to form the corresponding carboxylic acids and the hydrochlorides of aminomethyl derivatives of substituted aromatic compounds.

15. Compounds of the benzene series in which at least one hydrogen atom of the benzene nucleus is replaced by an amino group acylated with a fatty acid containing at least 12 carbon atoms and in which at least another hydrogen atom of a benzene nucleus is replaced by an aminomethyl group acylated with an aliphatic carboxylic acid containing a water-solubilizing group which products are liquid to solid water-soluble capillary active substances which are decomposed by boiling with hydrochloric acid to form the corresponding carboxylic acids and the hydrochlorides of aminomethyl derivatives of substituted aromatic compounds.

16. Compounds of the benzene series in which one hydrogen atom of the benzene nucleus is replaced by an amino group acylated with a fatty acid containing at least 12 carbon and in which at least another hydrogen atom of a benzene nucleus is replaced by an aminomethyl group acylated with an aliphatic carboxylic acid of low molecular weight containing a water-solubilizing group, which products are liquid to solid water-soluble capillary active substances which are decomposed by boiling with hydrochloric acid to form the corresponding carboxylic acids and the hydrochlorides of aminomethyl derivatives of substituted aromatic compounds.

17. Compounds of the benzene series in which one hydrogen atom of the benzene nucleus is replaced by an amino group acylated with a fatty acid containing at least 12 carbon atoms and in which at least another hydrogen atom of a benzene nucleus is replaced by an aminomethyl group acylated with an acetic acid containing a water-solubilizing group which products are liquid to solid water-soluble capillary active substances which are decomposed by boiling with hydrochloric acid to form the corresponding carboxylic acids and the hydrochlorides of aminomethyl derivatives of substituted aromatic compounds.

18. Compounds of the benzene series in which one hydrogen atom of the benzene nucleus is replaced by an amino group acylated with a fatty acid containing at least 12 carbon atoms and in which at least another hydrogen atom of a benzene nucleus is replaced by an aminomethyl group acylated with an acetic acid containing a quaternary ammonium group which products are liquid to solid water-soluble capillary active substances which are decomposed by boiling with hydrochloric acid to form the corresponding carboxylic acids and the hydrochlorides of aminomethyl derivatives of substituted aromatic compounds.

19. The product of the formula

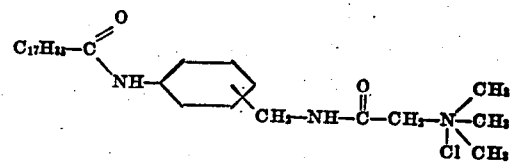

which product is a water-soluble, capillary active solid substance which is decomposed by boiling with hydrochloric acid one of the decomposition products being the hydrochloride of an aminomethyl derivative of stearic acid anilide.

20. The product of the formula

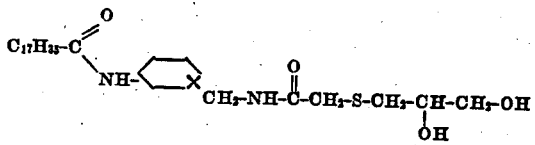

which product is a water-soluble, capillary active solid substance which is decomposed by boiling with hydrochloric acid one of the decomposition products being the hydrochloride of an aminomethyl derivative of stearic acid anilide.

21. Compounds of the benzene series in which two hydrogen atoms of the benzene nucleus are replaced by an amino group acylated with a fatty acid containing at least 12 carbon atoms and in which at least another hydrogen atom of a benzene nucleus is replaced by an aminomethyl group acylated with an aliphatic carboxylic acid of low molecular weight containing a water-solubilizing group which products are liquid to solid water-soluble capillary active substances which are decomposed by boiling with hydrochloric acid to form the corresponding carboxylic acids and the hydrochlorides of aminomethyl derivatives of substituted aromatic compounds.

22. The product of the formula

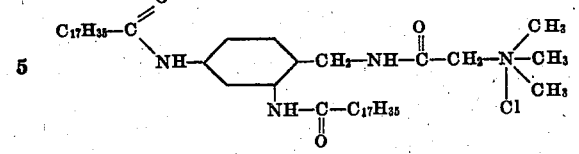

which product is a water-soluble, capillary active solid substance which is decomposed by boiling with hydrochloric acid one of the decomposition products being the hydrochloride of 2:4-distearoylamino-benzylamine.

CHARLES GRAENACHER.
RICHARD SALLMANN.
OTTO ALBRECHT.